(12) United States Patent
Solhusvik et al.

(10) Patent No.: US 9,402,039 B2
(45) Date of Patent: Jul. 26, 2016

(54) DUAL CONVERSION GAIN HIGH DYNAMIC RANGE SENSOR

(71) Applicant: OMNIVISION TECHNOLOGIES, INC., Santa Clara, CA (US)

(72) Inventors: Johannes Solhusvik, Haslum (NO); Robert Johansson, Oslo (NO)

(73) Assignee: OmniVision Technologies, Inc., Santa Clara, CA (US)

( * ) Notice: Subject to any disclaimer, the term of this patent is extended or adjusted under 35 U.S.C. 154(b) by 48 days.

(21) Appl. No.: 14/554,787

(22) Filed: Nov. 26, 2014

(65) Prior Publication Data

US 2015/0201140 A1    Jul. 16, 2015

Related U.S. Application Data

(60) Provisional application No. 61/926,124, filed on Jan. 10, 2014.

(51) Int. Cl.
*H04N 5/235* (2006.01)
*H04N 5/335* (2011.01)
(Continued)

(52) U.S. Cl.
CPC ........... *H04N 5/3559* (2013.01); *H04N 5/3594* (2013.01); *H04N 5/37452* (2013.01)

(58) Field of Classification Search
CPC ............ H04N 5/37452; H04N 5/3559; H04N 5/35554; H04N 5/3745; H04N 5/3535; H04N 5/2353; H01L 27/14831
USPC ........... 348/308, 314, 229.1, 230.1, 299, 300; 250/208.1
See application file for complete search history.

(56) References Cited

U.S. PATENT DOCUMENTS 7,033,074 B2    4/2006    Ikeda et al.
7,286,174 B1 *  10/2007   Weale ............ H04N 5/335
                                              250/208.1
(Continued)

FOREIGN PATENT DOCUMENTS

TW    200818461 A    4/2008
TW    200824111 A    6/2008
(Continued)

OTHER PUBLICATIONS

TW Application No. 104100797—Taiwanese Office Action and Search Report, with English Translation, issued Feb. 22, 2016 (6 pages).

*Primary Examiner* — Sinh Tran
*Assistant Examiner* — Xi Wang
(74) *Attorney, Agent, or Firm* — Blakely Sokoloff Taylor & Zafman LLP

(57) ABSTRACT

A method of reading out a pixel includes resetting a photodetector of the pixel. Light incident on the photodetector is then integrated for a single exposure of a single image capture. A floating diffusion node of the pixel is then reset. The floating diffusion is set to low conversion gain and a low conversion gain reset signal is sampled from the floating diffusion node. The floating diffusion is set to high conversion gain and a high conversion gain reset signal is sampled from the floating diffusion node. Charge carriers are transferred from the photodetector to the floating diffusion node and a high conversion image signal is then sampled from the floating diffusion node. The floating diffusion is set to low conversion gain. Charge carriers are transferred again from the photodetector to the floating diffusion node and a low conversion image signal is sampled from the floating diffusion node.

19 Claims, 6 Drawing Sheets

(51) Int. Cl.
*H04N 5/355* (2011.01)
*H04N 5/359* (2011.01)
*H04N 5/3745* (2011.01)

(56) References Cited

U.S. PATENT DOCUMENTS

| | | |
|---|---|---|
| 7,728,277 B2 | 6/2010 | Stevens et al. |
| 8,049,256 B2 | 11/2011 | Guidash |
| 8,293,629 B2 | 10/2012 | Mao et al. |
| 8,294,077 B2 | 10/2012 | Mao et al. |
| 2004/0251394 A1* | 12/2004 | Rhodes ............ H01L 27/14603 250/208.1 |
| 2007/0013798 A1 | 1/2007 | Ahn et al. |
| 2009/0059049 A1* | 3/2009 | Ohyama ................ H04N 5/343 348/311 |
| 2009/0272879 A1* | 11/2009 | Dai ...................... H04N 5/3559 250/208.1 |
| 2011/0309232 A1* | 12/2011 | Lyu ................... H04N 5/35581 250/208.1 |
| 2012/0002092 A1 | 1/2012 | Guidash |
| 2014/0151532 A1* | 6/2014 | Ito ........................ H04N 5/3575 250/208.1 |
| 2014/0263950 A1* | 9/2014 | Fenigstein ............. H04N 5/355 250/208.1 |

FOREIGN PATENT DOCUMENTS

| | | |
|---|---|---|
| TW | 201143066 A | 12/2011 |
| TW | 201208054 A | 2/2012 |

\* cited by examiner

| B | G | B | G |
|---|---|---|---|
| G | R | G | R |
| B | G | B | G |
| G | R | G | R |

FIG. 1

DUAL CONVERSION GAIN HIGH DYNAMIC RANGE SENSOR

REFERENCE TO RELATED APPLICATION

This application claims the benefit of U.S. Provisional Application No. 61/926,124, filed Jan. 10, 2014.

BACKGROUND INFORMATION

1. Field of the Disclosure

The present invention is generally related to image sensors, and more specifically, the present invention is directed to high dynamic range image sensors.

2. Background

Standard image sensors have a limited dynamic range of approximately 60 to 70 dB. However, the luminance dynamic range of the real world is much larger. Natural scenes often span a range of 90 dB and over. In order to capture the highlights and shadows simultaneously, HDR technologies have been used in image sensors to increase the captured dynamic range. The most common techniques to increase dynamic range is to merge multiple exposures captured with standard (low dynamic range) image sensors into a single linear HDR image, which has much larger dynamic range than a single exposure image.

One of the most common HDR sensor solutions would be having multiple exposures into one single image sensor. With different exposure integration times or different sensitivities (for example by inserting neutral density filters), one image sensor could have 2, 3, 4 or even more different exposures in a single image sensor. Multiple exposure images are available in a single shot using this HDR image sensor. However, overall image resolution is decreased using this HDR sensor compared to a normal full resolution image sensor. For example, for an HDR sensor that combines 4 different exposures in one image sensor, each HDR image would be only a quarter resolution of the full resolution image.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 1 is a diagram illustrating a portion of an example color pixel array in which each pixel is read out with dual conversion gain to achieve high dynamic range (HDR) imaging in accordance with the teachings of the present invention.

Figure 2:
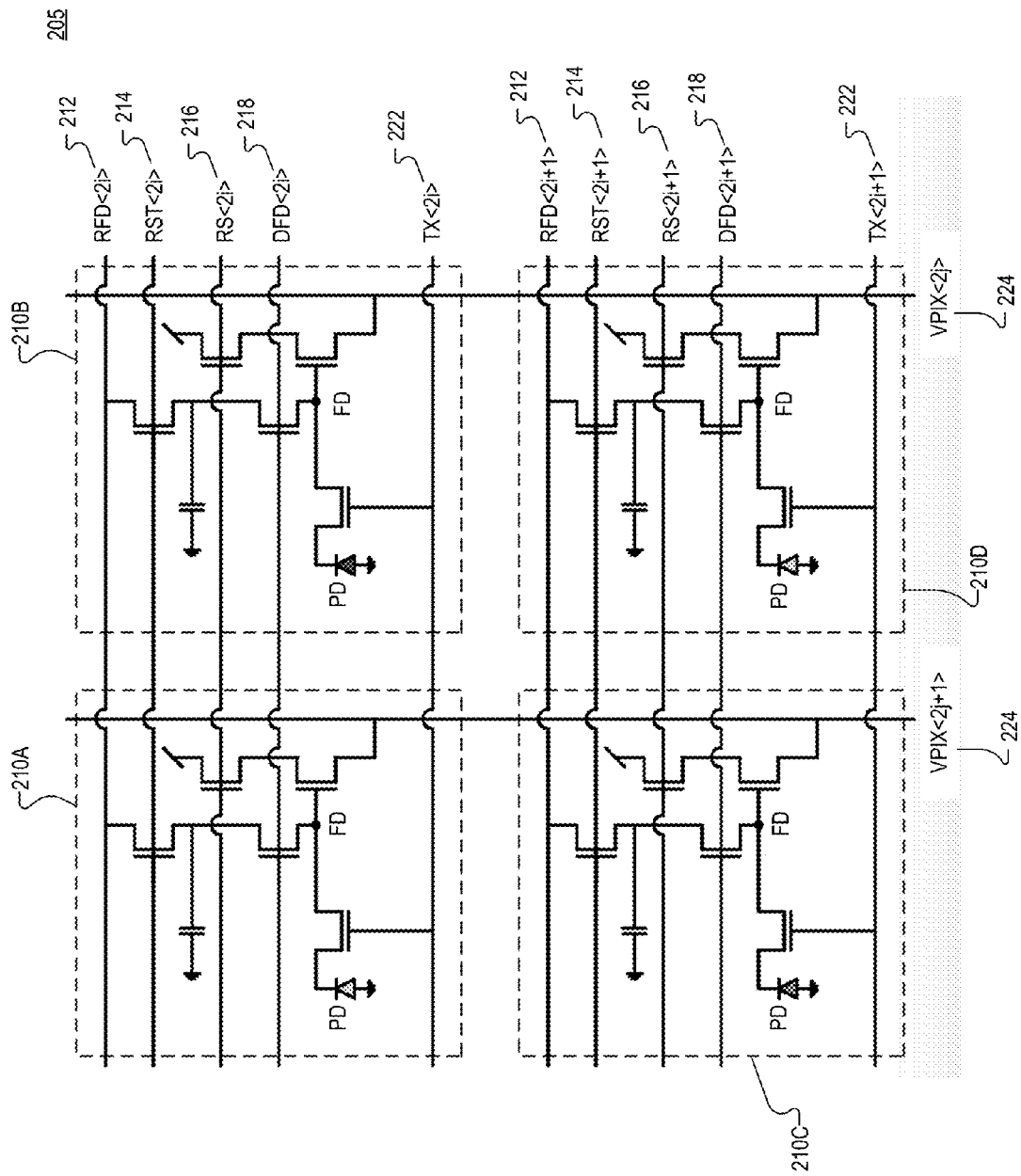
FIG. 2 is a circuit diagram showing example circuitry of a plurality of pixels of an example color pixel array in which each pixel is read out with dual conversion gain to achieve HDR imaging in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Examples in accordance with the teaching of the present invention describe color pixel array in which each pixel is read out with dual conversion gain to achieve HDR imaging in accordance with the teachings of the present invention. For instance, in one example, a color pixel array in accordance with the teachings of the present invention utilizes dual conversion gain pixels where the conversion gain is set to high or low by enabling or disabling a switch that couples an in-pixel capacitor to the floating diffusion (FD) node. In one example, every pixel in every frame is read out with both high conversion gain and low conversion and the selection of which value to use is done digitally. This way, the color pixel array in accordance with the teachings of the present invention can capture both bright objects and dark objects simultaneously in the same frame with a single exposure or a single integration time in accordance with the teachings of the present invention. Therefore, multiple exposures of high exposure times and low exposure times are no longer necessary, which can introduce challenges because the multiple exposures times do not occur simultaneously. Thus, the problems of ghosting and light flickering are eliminated since a color pixel array in accordance with the teachings of the present invention outputs pixel values with different conversion gains to produce HDR images with only one integration time per frame output.

Figure 1:
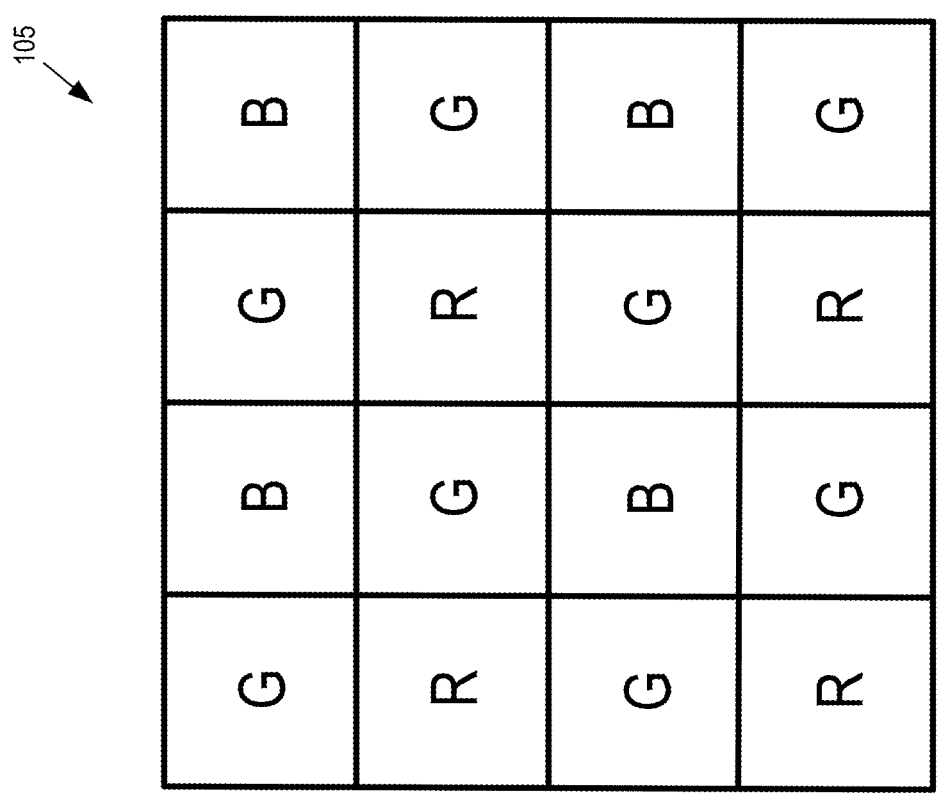

To illustrate, FIG. 1 is a diagram illustrating a portion of an example color pixel array 105 in which each pixel can be read out with both high conversion gain and low conversion gain with only one integration time per frame output in accordance with the teachings of the present invention. In the depicted example, pixel array 105 is a color pixel array having a Bayer filter pattern in which there are alternating rows of green (G) and blue (B) pixels, and red (R) and green (G) pixels to sense color images. In one example, each pixel has sides having a length of approximately 2.8 μm. It is appreciate of course that the pixels of example color pixel array 105 may have other dimensions, and that the example 2.8 μm dimension is provided as an illustration of one example in accordance with the teachings of the present invention.

FIG. 2 is a circuit diagram showing example circuitry of an example pixel array 205 in accordance with the teachings of the present invention. In the specific example depicted in FIG. 2, the example circuitry of four pixels 210A, 210B, 210C, and 210D are arranged into a plurality of rows and a plurality of columns of pixel array 205. It is noted that pixel array 205 may be an example of color pixel array 105 of FIG. 1, and that similarly named and numbered elements referenced below are coupled and function similar to as described above. Thus, in one example, pixels 210A and 210D may correspond with green (G) pixels, pixel 210B may correspond with a blue (B) pixel, and pixel 210C may correspond with a red (R) pixel. It is noted that pixels 210A, 210B, 210C, and 210D are otherwise substantially similar to one another. As shown in the example depicted in FIG. 2, each row of pixels (e.g., pixels 210A/210B, pixels 210C/210D) is coupled to receive an RFD signal 212, an RST signal 214, an RS signal 216, a DFD signal 218, and a TX signal 222 in accordance with the teachings of the present invention. The example depicted in FIG. 2 also illustrates that each column of pixels (e.g., pixels 210A/210C, pixels 210B/210D) is coupled to output VPIX signal 224 in accordance with the teachings of the present invention.

Figure 3:
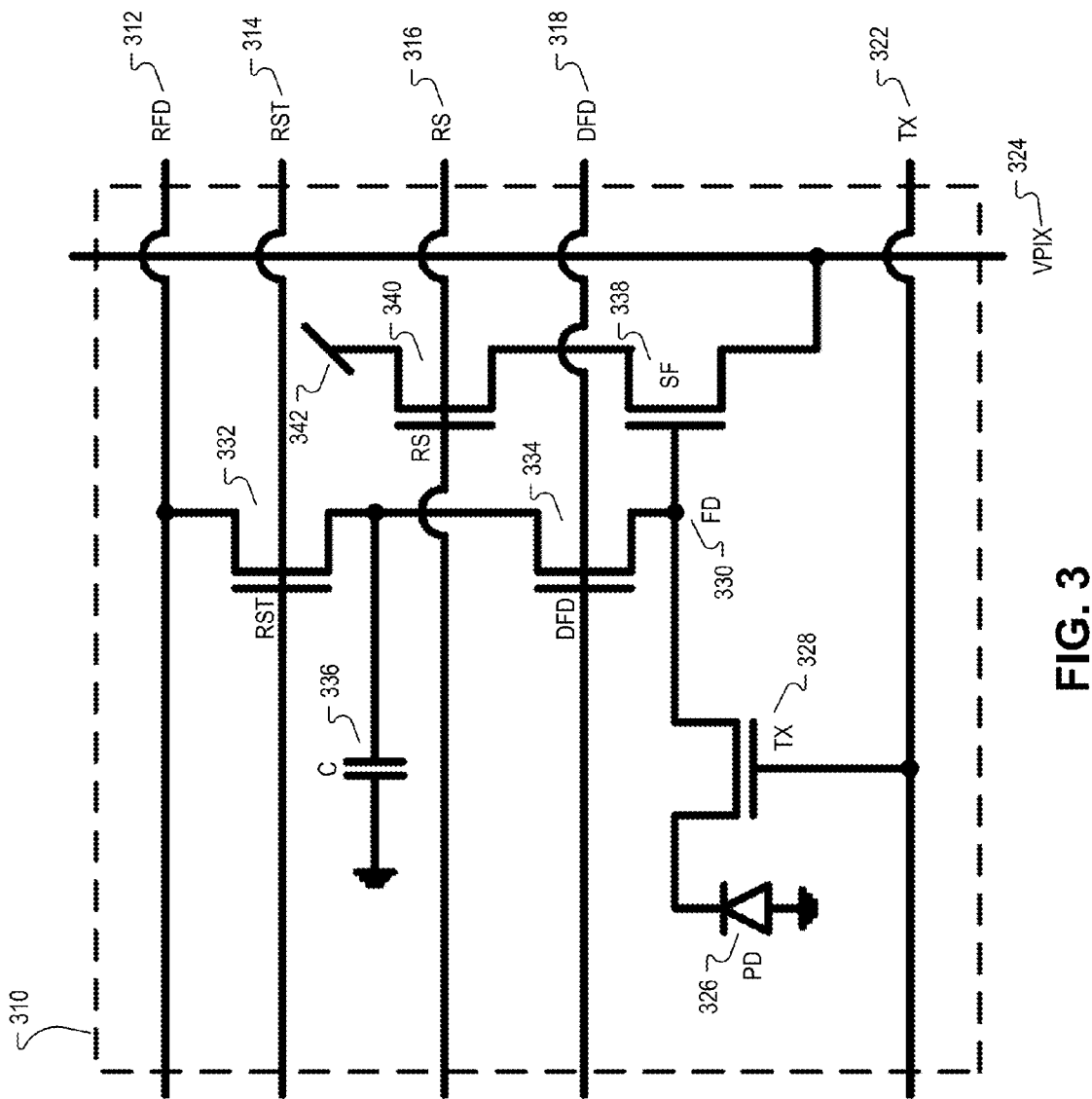
FIG. 3 is a circuit diagram showing example circuitry of a pixel that is read out with dual conversion gain to achieve HDR imaging in accordance with the teachings of the present invention.

FIG. 3 is a circuit diagram showing example circuitry of a pixel 310 that is read out with dual conversion gain to achieve HDR imaging in accordance with the teachings of the present invention. It is noted that pixel 310 of FIG. 3 may be an example one of the pixels 210A, 210B, 210C, or 210D of FIG. 2, and that similarly named and numbered elements referenced below are coupled and function similar to as described above. As shown in the example depicted in FIG. 3, pixel 310 includes a photodetector PD 326 coupled to a transfer transistor 328 that is coupled to be controlled by a TX signal 322. The transfer transistor 328 is coupled to a floating diffusion (FD) node 330.

In the depicted example, the floating diffusion (FD) node 330 is coupled to be reset to a RFD signal 312 voltage through a reset transistor 332 and a DFD transistor 334. In the illustrated example, the reset transistor 332 is coupled to be controlled in response to an RST signal 314, and the DFD transistor 334 is coupled to be controlled in response to a DFD signal 318. The example illustrated in FIG. 3 also illustrates that an in-pixel capacitor C 336 configured to be coupled to the floating diffusion (FD) node 330 though the DFD transistor 334 in response to the DFD signal 318 in accordance with the teachings of the present invention.

Continuing with the example depicted in FIG. 3, the floating diffusion (FD) node 330 is also coupled to the control terminal of an amplifier transistor, which in FIG. 3 is the source follower (SF) coupled transistor 338 having its gate terminal coupled to the floating diffusion (FD) node 330. In the depicted example, a row select transistor 340, which is controlled with the RS signal 316, is coupled between a voltage source terminal 342 and the drain terminal of the source follower (SF) transistor 338. In the depicted example, the source terminal of the source follower (SF) transistor 338 is coupled to the VPIX output 324, which is the output bitline of pixel 310, and through which the output signals of pixel 310 are read out in accordance with the teachings of the present invention.

Figure 4:
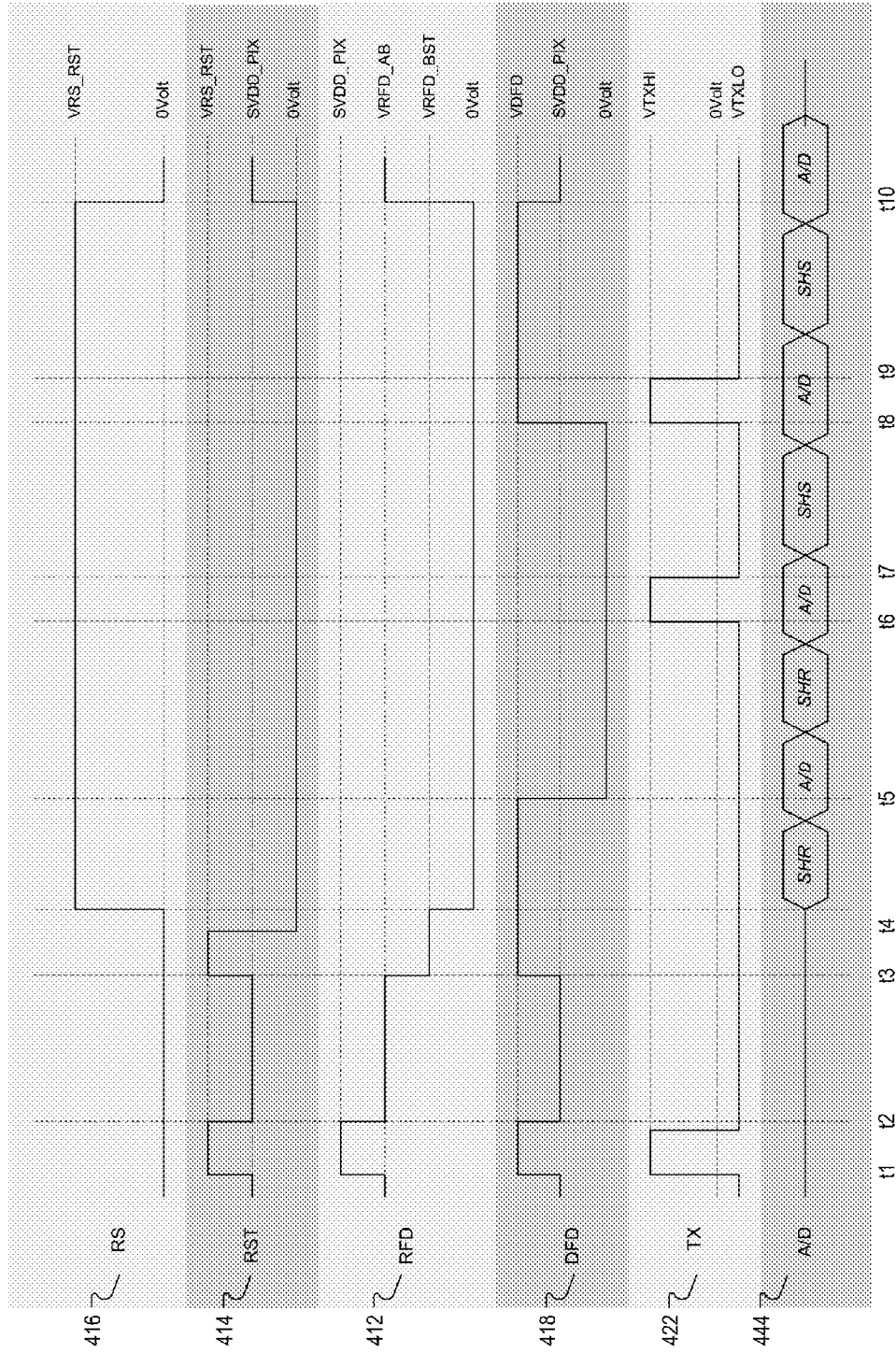
FIG. 4 is a timing diagram illustrating an example relationship of signals found in example circuitry of a pixel that is read out with dual conversion gain to achieve HDR imaging in accordance with the teachings of the present invention.

FIG. 4 is a timing diagram 415 illustrating an example relationship of signals found in example circuitry of a pixel, such as for example pixel 310 of FIG. 3, or pixels 210A, 210B, 210C, or 210D of FIG. 2. In particular, the example timing diagram 415 of FIG. 4 illustrates one example of reading out at pixel (e.g., pixel 310 of FIG. 3) to realize HDR performance with a single integration time or exposure in accordance with the teachings of the present invention.

To illustrate, at time t1 the reset signal RST 414 is pulsed to VRS_RST to turn on the reset transistor 332, the RFD signal 412 is pulsed to SVDD_PIX, the DFD signal 418 is pulsed to VDFD to turn on the DFD transistor 334, and the TX signal 422 is pulsed to VTXHI to turn on the transfer transistor 328 to reset the photodetector PD 326 (e.g., photodetector PD of FIG. 3). Once the photodetector PD 326 is reset, a single integration time or exposure of the photodetector PD 326 is commenced at time t2. During the single integration time or exposure at time t2 of the photodetector PD 326, charge carriers are photogenerated in the photodetector PD 326 in response to incident light on the photodetector PD 326. As shown in the depicted example, during the single exposure at time t2, the reset transistor 332 and DFD transistor 334 are biased at a slightly positive voltage SVDD_PIX in order to ensure a leakage path from photodetector PD 326 to the floating diffusion (FD) node 330 in case the photodetector PD 326 gets saturated and overfloods with charge, and the RFD signal 412 is set to VRFD_AB to support an anti-blooming path. In other words, in one example, the SVDD_PIX is the voltage on reset signal RST 314 and DFD signal 418 during the single integration time at time t2 to ensure an anti-blooming path in case the photodetector PD 326 overflows and leaks charge to floating diffusion (FD) node 330.

At time t3, the floating diffusion (FD) node 330 is reset by pulsing the RST signal 414 back to VRS_RST to turn on the reset transistor 332, the RFD signal 412 is set to VRFD_BST, and the DFD signal 418 is set to VDFD to turn on the DFD transistor 334. In the example, the RFD signal 412 is pulled down to VRFD_BST to support voltage boosting of the floating diffusion (FD) node 330 while the DFD transistor 334 is on, and the row select transistor 340 is off as shown.

At time t4, the floating diffusion (FD) node 330 is sampled at low conversion gain by setting the row select signal RS 416 to VRS_RST, setting the reset signal RST 414 to 0 volts, setting the RFD signal 412 to 0 volts, and maintaining the DFD signal 418 at VDFD to keep the DFD transistor 334 on. Indeed, with the DFD transistor 334 on, the in-pixel capacitor C 336 (e.g., capacitor C of FIG. 3) is coupled to the floating diffusion (FD) node 330, which enables a low conversion gain sampling of the floating diffusion (FD) node 330 in accordance with the teachings of the present invention. As shown on the A/D line 444 of timing diagram 415, a first sample/hold SHR operation occurs at time t4 to sample the reset voltage on floating diffusion (FD) node 330 at low conversion gain to generate a reset sample at low conversion gain.

At time t5, the DFD signal 418 is dropped to 0 volts, which turns off the DFD transistor 334, which decouples the in-pixel capacitor C 336 (e.g., capacitor C of FIG. 3) from the floating diffusion (FD) node 330, which enables a high conversion gain sampling of the floating diffusion (FD) node 330 in accordance with the teachings of the present invention. As shown on the A/D line 444 of timing diagram 415, a second sample/hold SHR operation occurs after the DFD transistor 334 has been turned off at time t5 to sample the reset voltage on floating diffusion (FD) 330 at high conversion gain to generate a reset sample at high conversion gain.

Continuing with the example depicted in FIG. 4, the TX signal 422 is pulsed at time t6, which pulses the gate of the transfer transistor 328 coupled to photodetector PD 326, which causes the photogenerated charge carriers in photodetector PD 326 to be transferred to the floating diffusion (FD) node.

At time t7, after the TX signal 422 is low again after the pulse, and the transfer transistor 328 is turned off, the signal on the floating diffusion (FD) node 330 is sampled again at high conversion gain with the DFD signal 418 remaining low and the DFD transistor 334 turned off to keep the in-pixel capacitor C 336 decoupled from the floating diffusion (FD) node 330. Indeed, as shown on the A/D line 444 of timing diagram 415, a first sample/hold SHS operation occurs after the transfer transistor 328 has been turned off at time t7 to sample the signal voltage on floating diffusion (FD) node 330 at high conversion gain to generate a signal sample at high conversion gain.

At time t8, the DFD signal 418 is set back to VDFD to turn on the DFD transistor 334 to couple the in-pixel capacitor C 336 to the floating diffusion (FD) node 330, which enables a low conversion gain sampling of the floating diffusion (FD) node 330 in accordance with the teachings of the present invention.

As shown in the depicted example, the TX signal 422 is illustrated as being pulsed again time t8, because if the photodetector PD 326 contains a large number of photogenerated electrons, the charge transfer from the photodetector PD 326 to the floating diffusion (FD) node 330 will stop once the voltage on the floating diffusion (FD) node 330 falls low enough. The pixel output VPIX 324 after the first signal sampling SHS at high conversion gain will be limited by the floating diffusion (FD) node 330 voltage swing. However, when the conversion gain is lowered by increasing the capacitance coupled to the floating diffusion (FD) 330 through the DFD transistor 334, the floating diffusion (FD) node 330 voltage will increase, which will make it now possible to transfer the photogenerated charge carriers from the photodetector PD 326, and therefore result in the second pulsing of the TX signal 422 at time t8 as shown in FIG. 4 in accordance with the teachings of the present invention.

At time t9, after the TX signal 422 is low and the transfer transistor 328 is turned off, the signal on the floating diffusion (FD) node 330 is sampled again at low conversion gain with the DFD signal 418 set to VDFD and the DFD transistor 334 turned on to couple the in-pixel capacitor C 336 to the floating diffusion (FD) node 330. Indeed, as shown on the A/D line 444 of timing diagram 415, a second sample/hold SHS operation occurs after the transfer transistor 328 has been turned off at time t9 to sample the signal voltage on floating diffusion (FD) node 330 at low conversion gain to generate a signal sample at low conversion gain.

Therefore, as illustrated in FIG. 4, an HDR image including a low conversion gain and a high conversion gain image acquisition be captured from the pixel with a single integration time or exposure in accordance with the teachings of the present invention. In one example, true correlated double sampling is realized with the capture of the reset voltage on the floating diffusion (FD) node 330 at both low conversion gain and high conversion gain, as well as the signal voltage on the floating diffusion (FD) node 330 at both low conversion gain and high conversion gain in accordance with the teachings of the present invention.

Indeed, the low conversion gain correlated double sampling output value of the pixel is equal to a difference between the reset sample at low conversion gain value (e.g., first SHR after t4) and the signal sample at low conversion gain value (e.g., second SHS after t9). In one example, the low conversion gain correlated double sampling output value of the pixel may be utilized for bright light conditions. Similarly, the high conversion gain correlated double sampling output value of the pixel is equal to a difference between the reset sample at high conversion gain value (e.g., second SHR after t5) and the signal sample at high conversion gain value (e.g., first SHS after t7). In one example, the high conversion gain correlated double sampling output value of the pixel may be utilized for low light conditions.

Therefore, it is appreciated that HDR imaging is realized using the above described structures and techniques by using the same single integration time or single exposure on the pixels, which therefore achieves an increase in the dynamic range of the pixel without suffering from ghosting or light flickering issues caused by multiple exposures in accordance with the teachings of the present invention.

Figure 5:
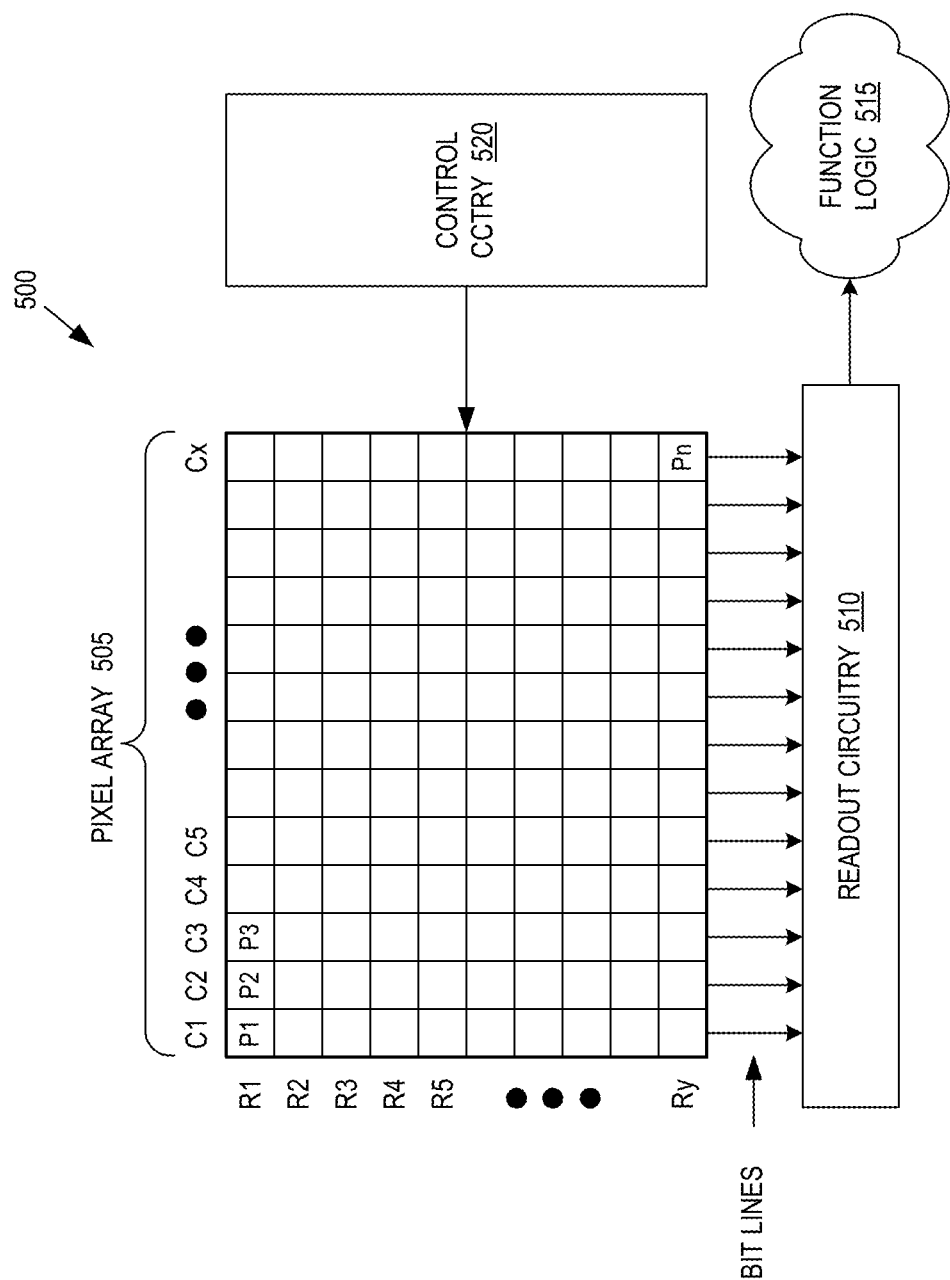
FIG. 5 is a diagram illustrating one example of an imaging system including a color pixel array in which each pixel is read out with dual conversion gain to achieve HDR imaging in accordance with the teachings of the present invention.

FIG. 5 is a diagram illustrating one example of an imaging system 500 including a color pixel array 505 in which each pixel is read out with dual conversion gain to achieve HDR imaging in accordance with the teachings of the present invention. As shown in the depicted example, imaging system 500 includes pixel array 505 coupled to control circuitry 520 and readout circuitry 510, which is coupled to function logic 515.

In one example, pixel array 505 is a two-dimensional (2D) array of image sensor pixel cells (e.g., pixels P1, P2, P3, . . . , Pn). It is noted that the pixel cells P1, P2, . . . Pn in the pixel array 505 may be examples of color pixel array 105 of FIG. 1 or color pixel array 205 of FIG. 2, and that similarly named and numbered elements referenced below are coupled and function similar to as described above. As illustrated, each pixel cell is arranged into a row (e.g., rows R1 to Ry) and a column (e.g., column C1 to Cx) to acquire image data of a person, place, object, etc., which can then be used to render a 2D image of the person, place, object, etc.

In one example, after each pixel cell P1, P2, P3, . . . , Pn has acquired its image data or image charge, the image data is readout by readout circuitry 510 and then transferred to function logic 515. In various examples, readout circuitry 510 may include amplification circuitry, analog-to-digital (ADC) conversion circuitry, or otherwise. Function logic 515 may simply store the image data or even manipulate the image data by applying post image effects (e.g., crop, rotate, remove red eye, adjust brightness, adjust contrast, or otherwise). In one example, readout circuitry 510 may readout a row of image data at a time along readout column lines (illustrated) or may readout the image data using a variety of other techniques (not illustrated), such as a serial readout or a full parallel readout of all pixels simultaneously.

In one example, control circuitry 520 is coupled to pixel array 505 to control operational characteristics of pixel array 505. In one example, control circuitry 520 is coupled to generate a global shutter signal for controlling image acquisition for each pixel cell. In the example, the global shutter signal simultaneously enables all pixels cells P1, P2, P3, . . . Pn within pixel array 505 to simultaneously enable all of the pixel cells in pixel array 505 to simultaneously transfer the image charge from each respective photodetector during a single acquisition window.

Figure 6:
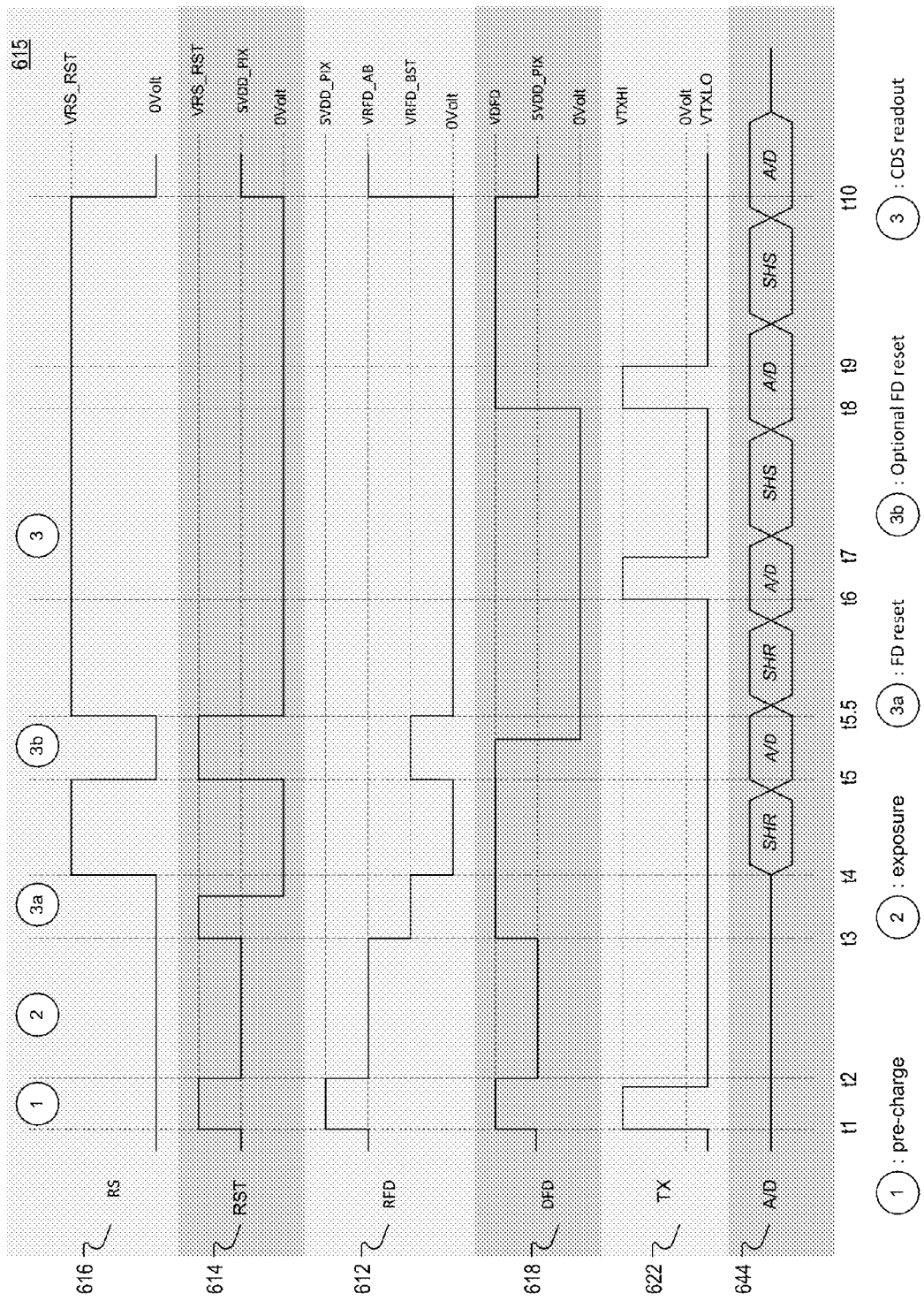
FIG. 6 is a timing diagram illustrating another example relationship of signals found in example circuitry of a pixel that is read out with dual conversion gain to achieve HDR imaging in accordance with the teachings of the present invention.

FIG. 6 is a timing diagram 615 illustrating another example relationship of signals found in example circuitry of a pixel, such as for example pixel 310 of FIG. 3, or pixels 210A, 210B, 210C, or 210D of FIG. 2. It is appreciated that the timing diagram of FIG. 6 shares many similarities with the example timing diagram 415 of FIG. 4. However, one difference is that the timing diagram 615 in FIG. 6 includes an optional reset of the floating diffusion (FD) node 330 that occurs during section 3b between time t5 and time t5.5 of the timing diagram 615 in FIG. 6, which corresponds to time t5 of timing diagram 415 of FIG. 4. Specifically, as shown during section 3b between time t5 and time t5.5 of FIG. 6, the RS signal 616 is dropped to 0 volts, the RST signal 614 is pulsed to VRS_RST, the RFD signal 612 is pulsed to VRFD_BST, and the DFD signal 618 remains high at VDFD to perform an optional floating diffusion (FD) node 330 reset. In the example, after the optional reset of the floating diffusion (FD) node 330 between time t5 and time t5.5, the timing diagram 615 of FIG. 6 resumes being substantially similar to the example timing diagram 415 of FIG. 4 in accordance with the teachings of the present invention.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A method of acquiring image data from a pixel from a single exposure of a single image capture in a high dynamic range (HDR) image sensor, comprising:
   resetting a photodetector of the pixel;
   integrating light incident on the photodetector for the single exposure of the single image capture;
   performing a first reset of a floating diffusion of the pixel;
   setting the floating diffusion to low conversion gain;
   sampling a low conversion gain reset signal from the floating diffusion;
   performing a second reset of the floating diffusion of the pixel after the sampling of the reset signal from the floating diffusion at the low conversion gain, and prior to a sampling of the reset signal from the floating diffusion at a high conversion gain;
   setting the floating diffusion to the high conversion gain;
   sampling a high conversion gain reset signal from the floating diffusion;
   transferring charge carriers photogenerated during the single exposure from the photodetector to the floating diffusion;
   sampling a high conversion gain image signal from the floating diffusion;
   setting the floating diffusion to the low conversion gain;
   transferring additional charge carriers photogenerated during the single exposure from the photodetector to the floating diffusion; and
   sampling a low conversion gain image signal from the floating diffusion.

2. The method of claim 1 further comprising determining a low conversion gain correlated double sampling image signal output value of the single exposure of the single image capture by finding a difference between the sampled low conversion gain image signal and the sampled low conversion gain reset signal.

3. The method of claim 1 further comprising determining a high conversion gain correlated double sampling image signal output value of the single exposure of the single image capture by finding a difference between the sampled high conversion gain image signal and the sampled high conversion gain reset signal.

4. The method of claim 1 wherein resetting the photodetector of the pixel comprises coupling the photodetector to a reset voltage.

5. The method of claim 4 further comprising setting the reset voltage of the pixel while integrating the light incident on the photodetector for the single exposure of the single image capture to provide an anti-blooming path from the photodetector to the floating diffusion node.

6. The method of claim 1 wherein resetting the floating diffusion of the pixel comprises coupling the floating diffusion to a boosting voltage.

7. The method of claim 1 wherein setting the floating diffusion to low conversion gain comprises coupling an in-pixel capacitor to the floating diffusion.

8. The method of claim 7 wherein setting the floating diffusion to high conversion gain comprises decoupling the in-pixel capacitor from the floating diffusion.

9. The method of claim 1 wherein transferring the charge carriers photogenerated during the single exposure from the photodetector to the floating diffusion comprises coupling the photodetector to the floating diffusion through a transfer transistor after setting the floating diffusion to the high conversion gain.

10. The method of claim 9 wherein transferring the additional charge carriers photogenerated during the single exposure from the photodetector to the floating diffusion comprises coupling the photodetector to the floating diffusion through the transfer transistor after setting the floating diffusion to the low conversion gain.

11. A pixel cell for use in a high dynamic range (HDR) image sensor, comprising:
   a photodetector adapted to photogenerate charge carriers in response to incident light during a single exposure of a single image capture of the HDR image sensor;
   a floating diffusion coupled to receive the charge carriers photogenerated in the photodetector;
   an in-pixel capacitor selectively coupled to the floating diffusion through a first transistor, wherein the floating diffusion is set to low conversion gain in response to the in-pixel capacitor being coupled to the floating diffusion, wherein the floating diffusion is set to high conversion gain in response to the in-pixel capacitor being decoupled to the floating diffusion; and
   a transfer transistor coupled between the photodetector and the floating diffusion, wherein the transfer transistor is adapted to be switched on a first time during the single exposure of the single image capture of the HDR image sensor to transfer the charge carriers photogenerated in the photodetector to the floating diffusion set to the high conversion gain, wherein the transfer transistor is adapted to be switched on a second time during the single exposure of the single image capture of the HDR image sensor to transfer the charge carriers photogenerated in the photodetector to the floating diffusion set to the low conversion gain.

12. The pixel cell of claim 11 further comprising an amplifier transistor having a gate terminal coupled to the floating diffusion to generate an output signal of the pixel cell to an output bitline of the pixel cell.

13. The pixel cell of claim 12 further comprising a row select transistor coupled to the amplifier transistor to selectively generate the output signal of the pixel cell to the output bitline of the pixel cell.

14. A high dynamic range (HDR) imaging system, comprising:
    a pixel array of pixel cells, wherein each one of the pixel cells includes:
        a photodetector adapted to photogenerate charge carriers in response to incident light during a single exposure of a single image capture of the HDR imaging system;
        a floating diffusion coupled to receive the charge carriers photogenerated in the photodetector;
        an in-pixel capacitor selectively coupled to the floating diffusion through a first transistor, wherein the floating diffusion is set to low conversion gain in response to the in-pixel capacitor being coupled to the floating diffusion, wherein the floating diffusion is set to high conversion gain in response to the in-pixel capacitor being decoupled to the floating diffusion; and
        a transfer transistor coupled between the photodetector and the floating diffusion, wherein the transfer transistor is adapted to be switched on a first time during the single exposure of the single image capture of the HDR imaging system to transfer the charge carriers photogenerated in the photodetector to the floating diffusion set to the high conversion gain, and wherein the transfer transistor is adapted to be switched on a second time during the single exposure of the single image capture of the HDR imaging system to transfer the charge carriers photogenerated in the photodetector to the floating diffusion set to the low conversion gain;
    a control circuitry coupled to the pixel array to control operation of the pixel array; and
    a readout circuitry coupled to the pixel array to readout image data from the plurality of pixels.

15. The HDR imaging system of claim 14 further comprising a function logic coupled to the readout circuitry to store the image data from each one of the plurality of pixel cells.

16. The HDR imaging system of claim 14 wherein each one of the plurality of pixel cells further comprises an amplifier transistor having a gate terminal coupled to the floating diffusion to generate the image data output from the pixel cell to an output bitline of the pixel cell.

17. The HDR imaging system of claim 16 wherein each one of the plurality of pixel cells further comprises a row select transistor coupled to the amplifier transistor to selectively generate the image data of the pixel cell to the output bitline of the pixel cell.

18. The HDR imaging system of claim 14 wherein each one of the plurality of pixel cells further comprises a reset transistor coupled to selectively reset the floating diffusion and the photodetector in response to a reset signal.

19. The HDR imaging system of claim 18 wherein the first transistor is selectively switched on with the reset transistor to reset the floating diffusion and the photodetector.

* * * * *